United States Patent [19]
Wiemer et al.

[11] Patent Number: 5,981,671
[45] Date of Patent: Nov. 9, 1999

[54] PROCESS AND APPARATUS FOR THE MICROSUSPENSION POLYMERIZATION OF VINYL CHLORIDE

[75] Inventors: Hardo Wiemer; Axel Dieckmann, both of Cologne; Steffen Kunze, Leverkusen; Oliver Mieden, Duesseldorf, all of Germany

[73] Assignee: Vinnolit Kunststoff GmbH, Ismaning, Germany

[21] Appl. No.: 09/108,330

[22] Filed: Jul. 2, 1998

[30] Foreign Application Priority Data

Jul. 3, 1997 [DE] Germany ............................ 197 28 487

[51] Int. Cl.⁶ ...................................................... C08F 2/18
[52] U.S. Cl. .................................. 526/64; 526/68; 526/70; 526/78; 526/80; 526/88; 526/89; 526/203; 526/344.2
[58] Field of Search .................................. 526/64, 68, 70, 526/78, 80, 88, 89, 203, 344.2

[56] References Cited

U.S. PATENT DOCUMENTS 4,377,672  3/1983  Geschonke et al. ..................... 526/203
4,528,337  7/1985  Kreilein et al. ........................... 526/70

FOREIGN PATENT DOCUMENTS 0016461   5/1982  European Pat. Off. .
0093936  11/1983  European Pat. Off. .

*Primary Examiner*—Samuel A. Acquah
*Attorney, Agent, or Firm*—Burgess, Ryan & Wayne

[57] ABSTRACT

The invention relates to a process and an apparatus for the microsuspension polymerization of vinyl chloride in vessels whose contents are agitated predominantly by natural convection where, in a reactor having a ratio of height H to diameter D of H/D 2, which is equipped externally or internally with a heat exchanger provided with water and connected to a pumped circulation system provided with water, the introduction of the cooling water takes place in the upper third of the heat exchanger and the cooling water is conducted downward and is conducted away in the lower third of the heat exchanger.

15 Claims, 2 Drawing Sheets

PROCESS AND APPARATUS FOR THE MICROSUSPENSION POLYMERIZATION OF VINYL CHLORIDE

BACKGROUND OF THE INVENTION

The invention relates to a process and an apparatus for the microsuspension polymerization of vinyl chloride in vessels whose contents are agitated predominantly by natural convection.

Polymerization reactors for polymerizing ethylenically unsaturated monomers in an aqueous medium, for example, for polymerizing vinyl chloride by a suspension, emulsion or microsuspension process, are predominantly constructed as vertically oriented pressure vessels with a stirrer and a cooling jacket. A pump is used to convey the cooling medium in the cooling jacket with the aim of increasing the flow velocity in the jacket and achieving a temperature which is, as far as possible, identical in all parts of the jacket. Dissipation of the heat of polymerization is improved by stirring the polymerization batch with a stirrer.

However, there are polymerization processes which have to be carried out without a stirrer because the aqueous polymerization mixture is sensitive to shear. An example of this is microsuspension polymerization of vinyl chloride homo- or copolymers, in which a homogenized aqueous dispersion of monomer, dispersing agent and free-radical generator is fed to the reactor and induced to polymerize. The homogenized dispersion cannot be stirred because it is sensitive to shear.

EP A 93936/(U.S. Pat. No. 4,528,337) describes an apparatus and a process for the microsuspension polymerization of vinyl chloride. The polymerization is carried out in a tubular shaped pressure vessel which has a large length to diameter ratio and is positioned vertically, optimizing heat exchange due to a large ratio of heat-exchange surface to contents and insuring agitation of the contents by natural convection, i.e., upwardly acting forces resulting from differences in temperature and/or density.

FIG. 1 depicts a reactor 1 of this type, representing the prior art. The reactor 1 is equipped with a cooling jacket 2 which serves as a heat exchanger to dissipate the heat of reaction. Water, as the cooling medium, is fed into a pumped circulation system 4 via a control valve 3, and, using a pump 5, is conveyed into the cooling jacket 2 via the inlet 6, which is arranged at the lower end of the reactor 1. The pump 5 is operated to insure a high circulation rate in order to insure uniform temperatures in the entire cooling jacket. The amount of water discharged at the overflow 7 at the upper end of the reactor 1 corresponds to the amount fed at the control valve 3. The flap valve 14 serves to direct the cooling water into the circulation system and prevents it from flowing out directly at the overflow 7.

At the start of the polymerization, the temperature in the water-filled pumped circulation system 4 is raised by feeding in steam via the control valve 8, in order to heat the reactor contents to polymerization temperature. After initiation of the exothermic polymerization reaction, the steam feed is stopped and the pumped circulation system 4 is cooled by feeding in cooling water via the control valve 3 in such a way that the heat of polymerization arising is dissipated to precisely the extent required to keep the temperature and/or the pressure of the reactor contents constant. To this end, pressure and temperature in the reactor 1 are determined with a thermometer 9 and a manometer 10; the thermometer 9 determines the inlet temperature of the cooling water, and after the measurements have been assessed, the appropriate amount of cooling water is introduced using the control valve 3.

The exothermic heat balance causes the polymerization batch to be more strongly heated in the middle of the reactor (in the vicinity of its axis) than in the vicinity of the walls. The resultant differences in density lead to an upward movement of the reactor contents in the vicinity of the axis and a downward movement in the cooled zone near the walls. This results in convective circulation, leading to agitation of the reactor contents together with improved heat transfer. In the embodiment described in EP-A 93936, this circulatory movement is supported by what is called "gas-bubble agitation", i.e., by blowing in an inert gas at the base of the reactor via the pipe 12 and, at the pipe 13, conducting away the inert gas which has been blown in.

A disadvantage of this method of operation is that the temperatures in the upper region of the reactor are markedly higher than in its lower region; these temperature differences become even greater as the polymerization progresses because the polymerization proceeds exothermically. A result of this is that the polymerization takes place at different temperatures and at different times in the regions mentioned, and therefore, there can be an undesirably broad distribution of properties decisive for quality such as the K value of the product.

BRIEF SUMMARY OF THE INVENTION

An object was therefore to provide a process and an apparatus for the microsuspension polymerization of vinyl chloride in vessels whose contents are agitated predominantly by natural convection, where the agitation of the polymerization mixture is improved by reinforcing natural convection and polymerization conditions in the reactor are made more uniform.

The invention provides a process for the microsuspension polymerization of vinyl chloride in an aqueous phase in the presence of dispersing agents and free-radical generators in a reactor 15 having a height H to diameter D ratio of $H/D \geq 2$ which, for heating the polymerization mixture to the polymerization temperature and for cooling the polymerization mixture during polymerization, is equipped externally or internally with a heat exchanger 16 to which water is admitted, which is linked to a pumped circulation system 18 to which water is admitted, wherein, for cooling the polymerization mixture during the polymerization, the cooling water is introduced in the upper third of the heat exchanger 16 and is conducted downward and is conducted away in the lower third of the heat exchanger 16.

In the microsuspension polymerization of vinyl chloride homo- and copolymers, the procedure is to prehomogenize the polymerization batch in the form of a dispersion of monomers, dispersing agents such as emulsifiers, and free-radical generator in water before initiating the polymerization. The homogenized polymerization mixture is then transferred into the reactor for polymerization. The homogenization, the recipes for the batches, and also the temperature and pressure conditions for the polymerization, are known to persons skilled in the art. For example, from [EP-A 93936] U.S. Pat. No. 4,528,337 and [EP-A 16461 U.S. Pat. No. 4,377,672, the relevant disclosure content of these publications is incorporated into the present application by reference.

DETAILED DESCRIPTION OF THE INVENTION

Examples of suitable comonomers which may be copolymerized in amounts of up to 20% by weight with vinyl chloride are vinyl halides such as vinyl fluoride, vinyl bromide and vinylidine chloride; vinyl esters such as vinyl acetate, vinyl propionate and vinyl laurate; acrylates, and also mono- and diesters of maleic and fumaric acid.

The polymerization is generally carried out at a temperature of from 30 to 90° C. To bring about the polymerization, the monomer-soluble free-radical generators generally used for microsuspension polymerization are used in amounts of preferably from 0.01 to 3.0% by weight based on the monomer phase. Examples of suitable monomer-soluble initiators are: diacyl peroxides such as diacetyl and dilauryl peroxide; dialkyl peroxides such as di-tert-butyl peroxide; peresters such as tert-butyl peroxyneodecanoate; peroxodicarbonates such as di-tert-butyl-cyclohexyl or dimyristyl peroxodicarbonate; and azobisisobutyronitrile.

The initiation may either take place directly by increasing the temperature, or at lower temperatures through the use of reducing agents. Examples of suitable reducing agents are sodium formaldehyde sulfoxylate, sodium sulfite, sodium hydrogensulfite, dithionite and ascorbic acid, which may be used in amounts of preferably from 0.01 to 0.5% by weight, based on the monomer phase.

The dispersing agents which can be used in the microsuspension polymerization are the commonly used ionic and non-ionic emulsifiers. It is preferable to use 0.1 to 10.0% by weight of emulsifier based on the monomer phase. Examples of suitable emulsifiers are anionic surfactants such as alkyl sulfates having a chain length of from 8 to 18 carbon atoms, alkyl and alkylaryl ether sulfates having from 8 to 18 carbon atoms, alkyl and alkylaryl ether sulfates having from 8 to 18 carbon atoms in the hydrophobic radical and up to 40 ethylene oxide or propylene oxide units; alkyl or alkylaryl sulfonates having from 8 to 18 carbon atoms, oleic acid sulfonates, and esters and monoesters of sulfosuccinic acid with monohydric alcohols or alkylphenols. Examples of suitable non-ionic surfactants are alkyl polyglycol ethers and alkylaryl polyglycol ethers having from 8 to 40 ethylene oxide units.

If desired, buffer substances may also be used for the polymerization; for example, sodium carbonate, sodium hydrogenphosphate or alkali metal acetates.

Figure 2:
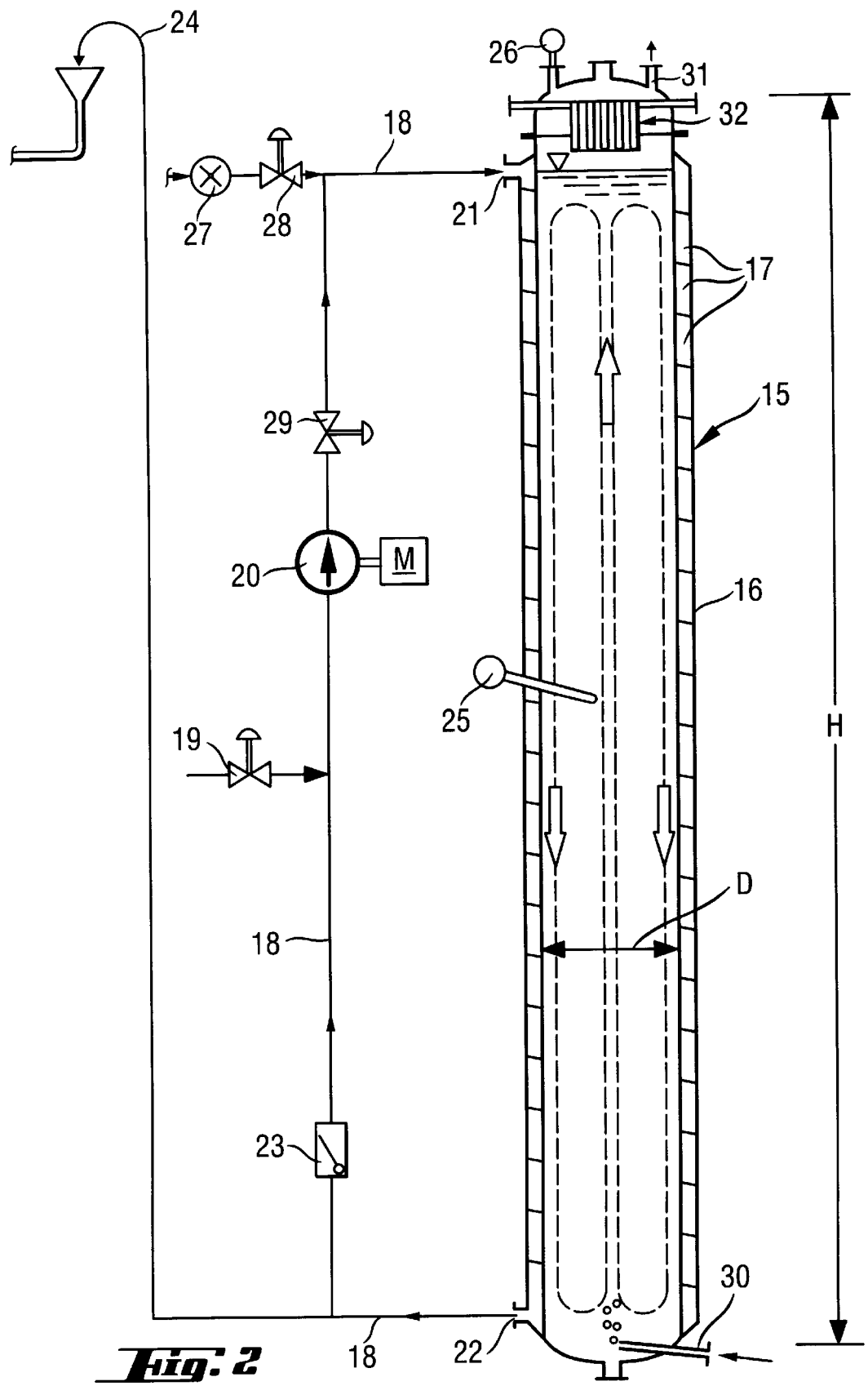
FIG. 2 is a diagrammatic representation of the process of the invention.

The novel mode of operation, and also an apparatus for carrying out the novel process, are described in more detail using FIG. 2.

The polymerization batch is placed into the reactor 15, preferably a tubular reactor standing vertically and having a H/D ratio of height H to diameter D of preferably from 2 to 50. The reactor 15 is equipped externally or internally with a heat exchanger 16. Heat exchanger designs which may be used are a double wall located externally or, located internally, half-tube, angle and bell-shaped profiles. The tubular reactor is preferably equipped with double walls between which heating or cooling medium flows. In a particularly preferred embodiment, the double wall is equipped with channels 17 which conduct the heating or cooling medium spirally downward.

The heat exchanger 16 is connected to the pumped circulation system 18, to which water is generally admitted as heating/cooling medium. In contrast to the prior art, the pumped circulation system 18 is constructed so that the water enters into the heat exchanger 16 in the upper third of the reactor 15, preferably at the top of the reactor, and is discharged in the lower third of the rector 15, preferably at the base of the reactor.

To initiate the polymerization, superheated steam is introduced into the pumped circulation system 18 via the steam connection 19, and conducted into the heat exchanger 16 via the entry pipe 21 at the top of the reactor, using the pump 20. The steam flows through the heat exchanger and is discharged at the base of the reactor, at the discharge pipe 22. The flap valve 23 controls the steam flow to the overflow 24. The thermometer 25 and the manometer 26 indicate when polymerization temperature and pressure are achieved.

When the polymerization temperature has been reached, the steam feed is stopped and, through the inlet pipe 21, cooling water is conducted via the flow meter 27 and the control valve 28 into the cooling jacket 16. After the cooling water has been discharged from the discharge pipe 22, it is conducted directly to the overflow 24. The polymerization temperature and polymerization pressure are monitored by the thermometer 25 and the manometer 26, and held constant by using the flow meter 27 and the control valve 28 to regulate the cooling water feed. The cooling water may also be recirculated using the pump 20, and using the control valve 29. It is possible for the cooling water recirculation to be reduced to an amount of recirculation which can be set as desired.

In a preferred embodiment, the forced circulation of the cooling water is reduced after initiation of the polymerization. To this end, the circulation rate of the pump 20, which is normally about 100 m$^3$/h, is reduced to a throughflow rate of from 10 to 50 m$^3$/h. In a particularly preferred embodiment, the pump 20 is switched off after the polymerization temperature has been achieved, and the cooling water is introduced into the heat exchanger 16 without forced circulation.

The polymerization reactor 15 may also be operated with gas-bubble agitation according to EP-A 93936, i.e., with an inert gas feed at the point 30 and corresponding removal of exhaust gas at the point 31, in order to support convective recirculation. In a preferred embodiment, the gas-bubble agitation is dispensed with, since convective flow in the reactor is reinforced to a significantly greater extent by the cooling water conducted according to the invention than by gas-bubble agitation. Dispensing with gas-bubble agitation opens up the possibility of installing a reflux condenser 32 in the gas space of the reactor above the polymerization mixture and using condensation of the gaseous monomers for additional heat dissipation, thus reducing polymerization time.

Conducting the cooling water according to the invention reinforces convective flow, giving uniformity of polymerization conditions in the polymerization mixture. Besides an improvement in the quality of the polymerization product as a result of narrower K-value distribution, shorter overall polymerization times are also achieved, i.e., better space-time performance. The consumption of free-radical initiator is lower because the polymerization time is shorter. Other advantages of the novel method of operation consists in avoiding overheating at the top of the reactor, saving electrical energy through taking the cooling water pump out of operation and the possibility of very precise measurement of conversion with the aid of cooling-water volume measurements during the process as a result of the relatively high temperature difference between the cooling water inlet and cooling water discharge. The possibility of measuring conversion precisely means that if more than one adjacent reactor is operated with the novel procedure, these may be controlled so that their running times are adjusted with respect to each other thus improving the cycle times in the downstream devolatilization apparatuses increasing, to each of which more than one reactor is allocated, and overall throughput rate. The novel process method requires less cooling water because the temperature rise of the cooling water is greater.

The following examples serve to describe the invention further:

EXAMPLE 1 (Comparative Example)

Figure 1:
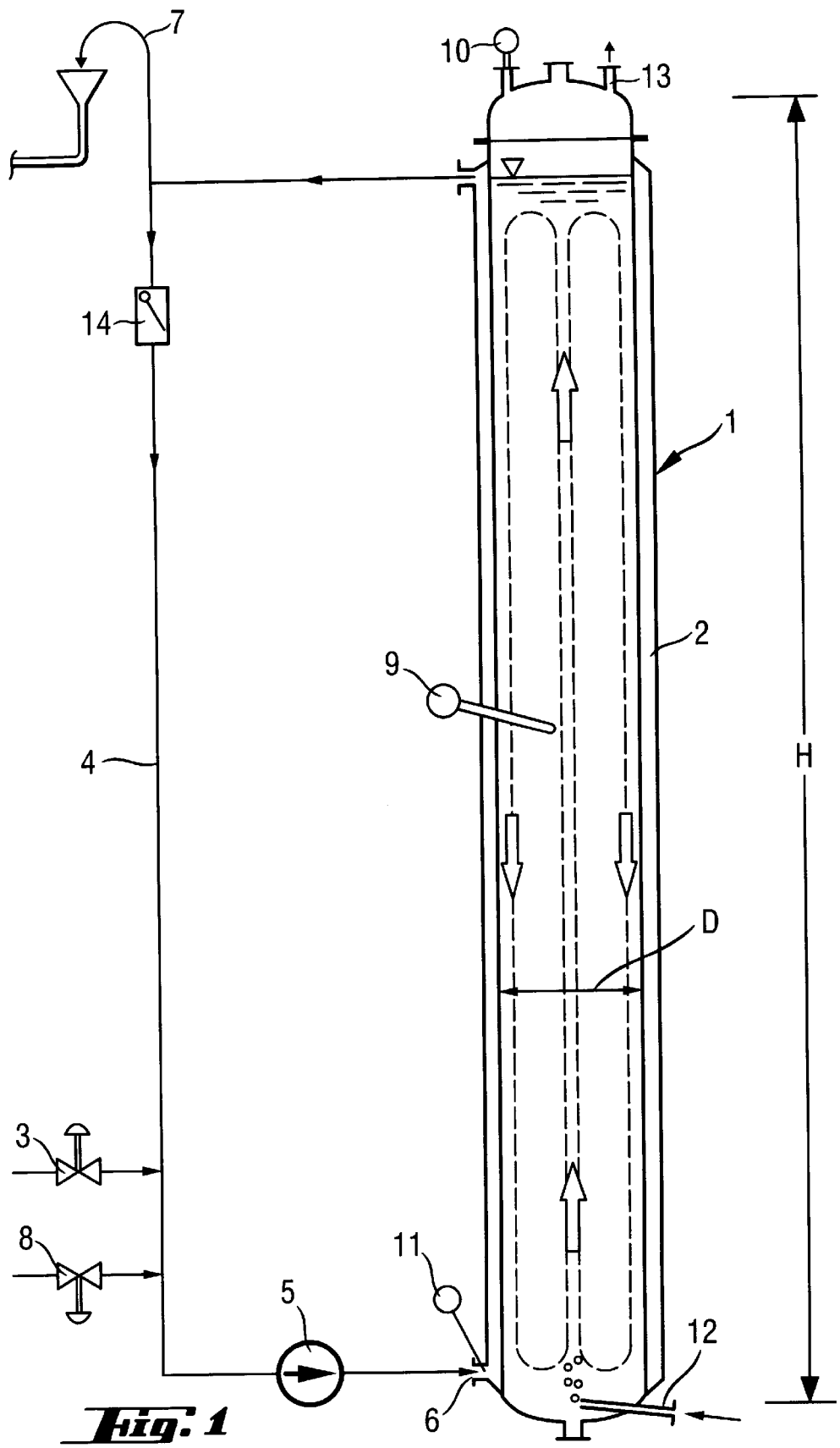
FIG. 1 is a diagrammatic representation of a prior art process.

A homogenized mixture of 7,200 kg of vinyl chloride, 6,700 kg of demineralized water, 480 kg of emulsifier and 23.3 kg of initiator were placed into a tubular reactor according to FIG. 1 for preparing microsuspension PVC and holding 16.6 m$^3$, with an internal diameter of 1.06 m and an overall length of 19 m. The polymerization mixture was heated to an internal temperature of 52° C. by introducing steam into a pumped circulation system and conducting the resultant hot water through the reactor jacket by the process method according to FIG. 1, and the heat of polymerization was dissipated by switching the pumped circulation system from steam feed to cooling water feed. The cooling water feed was regulated in such a way that the internal temperature measured at the middle of the reactor was constant at 52° C. After a polymerization time of 14.3 hours, the polymerization was terminated at 89% conversion, i.e., after 6,400 kg of PVC had been polymerized.

The volume of cooling water fed in was on average 8.5 m$^3$/h. The temperature of the cooling water fed in was 12° C. The temperature of the cooling water discharged was on average 31.5° C. The total volume of cooling water was measured as 121 m$^3$. From the data mentioned above, a specific cooling water consumption of 18.9 m$^3$/metric ton of PVC and a space-time performance of the reactor of 27.0 kg of PVC/m$^3$×h can be calculated based on the polymerication time and the volume held by the reactor. During the polymeriation, average internal temperatures measured were 46° C. at the lower end of the reactor, 52° C. in the middle of the reactor and 60° C. at the upper end of the reactor.

EXAMPLE 2 (According to the Invention)

A polymerization mixture of the same make-up as in Example 1 was placed into a tubular reactor according to the FIG. 2 holding 16.6 m$^3$, with an internal diameter of 1.06 m and an overall length of 19 m, and the contents were heated to 52° C. For dissipating the heat of polymerization, the recirculating pump was switched off and the reactor jacket was cooled by introducing cooling water at the level of the top of the reactor and discharging the same at the level of the base of the reactor. The cooling water feed was regulated in such a way that the internal temperature mmeasured in the middle of the reactor was constant at 52° C. After a polymerization time of 12.1 hours, the polymerization was terminated at 90% conversion, i.e., after 6,480 kg of PVC had been polymerized.

The volume of cooling water fed in was on average 9.1 m$^3$/h. The temperature of the cooling water fed in was 12° C. The temperature of the cooling water discharged was on average 33.8° C. The total volume of cooling water was measured as 110 m$^3$. From the data mentioned above, a specific cooling water consumption of 17.0 m$^3$/metric ton of PVC and a space-time performance of the reactor of 32.3 kg of PVC/m$^3$×h can be calculated, based on the polymerization time and the volume held by the reactor. During the polymerization, average internal temperatures measured were 50° C. in the middle of the reactor and 56° C. at the upper end of the reactor.

The novel procedure according to Example 2 thus gave about 10% reduction in specific cooling water usage and about 20% increase in space-time performance, compared with the method of operation according to Example 1. In addition, over the polymerization time of 14.3 h and based on 6,400 kg of PVC, 22.3 kWh/metric ton of PVC were saved by dispensing with the electrical power requirement of Example 1 for the pump with a pump rating of 10 kW. The polymerization conditions were significantly more uniform in the procedure according to Example 2 than in Example 1, as can be seen from the results of temperature measurement for the individual regions of the reactor for Example 2 (Example 1): 50(46)° C./52(52)° C./56(60)° C.

We claim:

1. A process for the microsuspension polymerization of vinyl chloride in an aqueous phase in the presence of dispersing agents and free-radical generators in a reactor having a height H to diameter D ratio of H/D 2 which, for heating a polymerization mixture to a polymerization temperature and for cooling the polymerization mixture during polymerization, is equipped with a heat exchanger to which water is admitted which is in fluid communication with a pumped circulation system to which water is admitted, wherein, for cooling the polymerization mixture during the polymerization, the cooling water is introduced in the upper third of the heat exchanger and is conducted downward, and is conducted away in the lower third of the heat exchanger.

2. The process as claimed in claim 1, wherein the cooling water is introduced by means of forced circulation by a pump with a throughflow rate of from 10 to 50 m$^3$/h.

3. The process as claimed in claim 1, wherein a pump is switched off after the polymerization temperature has been achieved, and the cooling water is introduced into the heat exchanger without forced circulation.

4. The process as claimed in claim 1 wherein gas-bubble agitation is used during the polymerization.

5. An apparatus for the microsuspension polymerization of vinyl chloride in an aqueous phase in the presence of dispersing agents and free-radical generators including a reactor 15 having a height H to diameter D ratio of H/D 2 which, for heating a polymerization mixture to a polymeriation temperature and for cooling the polymerization mixture during polymerization, is equipped with a heat exchanger to which water is admitted, which is in fluid communication with a pumped circulation system to which water is admitted, wherein the fluid communication of the pumped circulation system to the heat exchanger is so constructed that a feed pipe is arranged in the upper third of the heat exchanger and a discharge pipe is arranged in the lower third of the heat exchanger.

6. The apparatus as claimed in claim 5, wherein the reactor is equipped with a double wall as the heat exchanger.

7. The apparatus as claimed in claim 6, wherein the double wall is equipped with channels 17 which conduct the water spirally downward.

8. The apparatus as claimed in claim 5 wherien the reactor is equipped with an inlet for introduction of inert gas and an outlet for removal of exhaust gas.

9. The apparatus as claimed in claim 5 wherein a reflux condenser is arranged in the gas space of the reactor above the polymerization mixture.

10. The process of claim 2, wherein a pump is switched off after the polymerization temperature has been achieved, and the cooling water is introduced into the heat exchanger without forced circulation.

11. The apparatus as claimed in claim 6 wherein the reactor is equipped with an inlet for introduction of inert gas and an outlet for removal of exhaust gas.

12. The apparatus as claimed in claim 7 wherein the reactor is equipped with an inlet for introduction of inert gas and an outlet for removal of exhaust gas.

13. The apparatus as claimed in claim 6 wherein a reflux condenser is arranged in the gas space of the reactor above the polymerization mixture.

14. The apparatus as claimed in claim 7 wherein a reflux condenser is arranged in the gas space of the reactor above the polymerization mixture.

15. The apparatus as claimed in claim 8 wherein a reflux condenser is arranged in the gas space of the reactor above the polymerization mixture.

* * * * *